United States Patent
Rousso

(10) Patent No.: US 10,063,421 B2
(45) Date of Patent: Aug. 28, 2018

(54) SYSTEM AND METHOD FOR IDENTIFYING IMAGING DEVICES

(71) Applicant: Verint Systems, Ltd., Herzliya Pituach (IL)

(72) Inventor: Sharon Rousso, Tel Aviv (IL)

(73) Assignee: VERINT SYSTEMS, LTD., Herzliya Pituach (IL)

(*) Notice: Subject to any disclaimer, the term of this patent is extended or adjusted under 35 U.S.C. 154(b) by 37 days.

(21) Appl. No.: 15/259,098

(22) Filed: Sep. 8, 2016

(65) Prior Publication Data
US 2017/0070475 A1    Mar. 9, 2017

(30) Foreign Application Priority Data
Sep. 9, 2015   (IL) .......................................... 241387

(51) Int. Cl.
| | |
|---|---|
| H04L 12/24 | (2006.01) |
| H04L 29/06 | (2006.01) |
| H04L 29/12 | (2006.01) |
| H04N 7/18 | (2006.01) |
| H04W 12/06 | (2009.01) |

(52) U.S. Cl.
CPC ........ *H04L 41/0893* (2013.01); *H04L 63/302* (2013.01); *H04N 7/181* (2013.01); *H04L 41/12* (2013.01); *H04L 61/103* (2013.01); *H04L 61/609* (2013.01); *H04L 61/6054* (2013.01); *H04L 63/083* (2013.01); *H04W 12/06* (2013.01)

(58) Field of Classification Search
CPC ..... H04L 9/085–9/088; H04L 12/18–12/1845; H04L 29/06387–29/06469; H04L 29/06551–29/06605; H04L 29/08099–29/08144; H04L 43/02–43/0817; H04L 61/1547–61/1594; H04L 63/30–63/308; H04N 7/18–7/188
See application file for complete search history.

(56) References Cited

U.S. PATENT DOCUMENTS

| | | | |
|---|---|---|---|
| 8,959,025 B2 | 2/2015 | Malinsky | |
| 2013/0108114 A1* | 5/2013 | Aviad | H04L 63/306 382/103 |
| 2016/0364966 A1* | 12/2016 | Dixon | H04N 7/181 382/103 |

* cited by examiner

*Primary Examiner* — Timothy J Weidner
(74) *Attorney, Agent, or Firm* — Meunier Carlin & Curfman

(57) ABSTRACT

Embodiments described herein facilitate receipt of image data, by providing apparatus and methods for constructing and/or utilizing a database of networked imaging devices. Communication transmitted over a network is identified as being from an imaging device. One or more identifiers, under which the communication is transmitted, are then extracted from the communication. For example, one or more Internet Protocol (IP) addresses may be extracted. The identifiers are associated in a database with respective physical locations. When a particular area is defined as an area of interest, at least one of the identifiers is selected from the database, the selected identifier being associated with a physical location that is within, or near, the area of interest. Image data transmitted under the selected identifier is then received by the interested parties.

16 Claims, 3 Drawing Sheets

SYSTEM AND METHOD FOR IDENTIFYING IMAGING DEVICES

FIELD OF THE DISCLOSURE

The present disclosure relates to identifying imaging devices that communicate over a public network, such as the Internet, and/or receiving image data from such devices, e.g., for security purposes.

BACKGROUND OF THE DISCLOSURE

Some imaging devices are able to communicate over a public network, such as the Internet.

SUMMARY OF THE DISCLOSURE

There is provided, in accordance with some embodiments described herein, a method for storing identifiers. Communication transmitted over a network is identified as being from an imaging device. From the communication, one or more identifiers under which the communication is transmitted are extracted. The identifiers are then stored in a digital memory.

In some embodiments, identifying the communication as being from an imaging device includes identifying the communication as being from an imaging device by ascertaining that the communication includes image data.

In some embodiments, extracting the identifiers includes extracting one or more Internet Protocol (IP) addresses.

In some embodiments, extracting the identifiers includes extracting one or more International Mobile Subscriber Identities (IMSIs).

In some embodiments, storing the identifiers in the digital memory includes associating, in the digital memory, the identifiers with respective physical locations.

In some embodiments, the method further includes obtaining the association between the identifiers and the respective physical locations from one or more communication service providers (CSPs).

In some embodiments, the method further includes:
selecting, from the digital memory, at least one of the identifiers; and
selectively receiving image data transmitted under the selected identifier.

In some embodiments, the method further includes:
logging in to at least one imaging device that transmits under the selected identifier; and
driving the imaging device to transmit the image data over the network.

In some embodiments, logging in to the imaging device includes logging in to the imaging device using default access credentials for the imaging device.

In some embodiments, the method further includes controlling an imaging parameter of the imaging device.

In some embodiments, selecting the identifier includes selecting the identifier in response to the identifier being associated in the digital memory with a physical location that is in proximity to a defined area of interest.

In some embodiments, the method further includes defining a particular area as the area of interest.

In some embodiments, defining the particular area as the area of interest includes defining the particular area as the area of interest in response to identifying that a particular subject is visiting the particular area.

In some embodiments, defining the particular area as the area of interest includes automatically defining the particular area as the area of interest.

In some embodiments, defining the particular area as the area of interest includes defining the particular area as the area of interest in response to an indication emanating from the particular area.

In some embodiments, the indication is transmitted over the network by a device located in the particular area, the method including defining the particular area as the area of interest in response to the indication.

There is further provided, in accordance with some embodiments described herein, monitoring apparatus for use with a digital memory. The apparatus includes a network interface and a processor. The processor, via the interface, identifies communication transmitted over a network as being from an imaging device. The processor extracts, from the communication, one or more identifiers under which the communication is transmitted, and stores the identifiers in the digital memory.

In some embodiments, the processor is configured to identify the communication as being from an imaging device by ascertaining that the communication includes image data.

In some embodiments, the apparatus further includes the digital memory.

In some embodiments, the processor is configured to extract the identifiers by extracting one or more Internet Protocol (IP) addresses.

In some embodiments, the processor is configured to extract the identifiers by extracting one or more International Mobile Subscriber Identities (IMSIs).

In some embodiments, the processor is further configured to associate, in the digital memory, the identifiers with respective physical locations.

In some embodiments, the processor is further configured to:
select, from the digital memory, at least one of the identifiers, and
via the network interface, selectively receive image data transmitted under the selected identifier.

In some embodiments, the processor is further configured to, via the network interface:
log in to at least one imaging device that transmits under the selected identifier, and
drive the imaging device to transmit the image data over the network.

In some embodiments, the processor is configured to log in to the imaging device using default access credentials for the imaging device.

In some embodiments, the processor is further configured to, via the network interface, control an imaging parameter of the imaging device.

In some embodiments, the processor is configured to select the identifier in response to the identifier being associated in the digital memory with a physical location that is in proximity to a defined area of interest.

In some embodiments, the processor is further configured to define a particular area as the area of interest.

There is further provided, in accordance with some embodiments described herein, a computer software product including a tangible non-transitory computer-readable medium in which program instructions are stored. The instructions, when read by a processor, cause the processor to (i) identify communication transmitted over a network as being from an imaging device, (ii) extract, from the communication, one or more identifiers under which the communication is transmitted, (iii) associate, in a digital memory, the identifiers with respective physical locations, (iv) select, from the memory, at least one of the identifiers, the selected identifier being associated in the memory with one of the physical locations that is in proximity to a defined area of interest, and (v) selectively receive image data transmitted over the network under the selected identifier.

The present disclosure will be more fully understood from the following detailed description of the embodiments thereof, taken together with the drawings in which:

DETAILED DESCRIPTION OF EMBODIMENTS

Overview

Certain objects and devices, such as imaging devices, are able to communicate over a public digital network. For example, the "Internet of Things" (IoT) is a concept that covers the use of such objects and devices.

In some cases, interested parties, such as security and/or law enforcement agencies, may wish to monitor activity in a particular area of interest (AOI). Hence, it may be advantageous for such interested parties to receive image data (i.e., still images or videos) of the AOI from imaging devices that are already installed within or near the AOI. Embodiments described herein facilitate such receipt of image data, by providing apparatus and methods for constructing and/or utilizing a database of networked imaging devices.

Communication transmitted over a network (e.g., a public network such as the Internet) is identified as being from an imaging device. One or more identifiers, under which the communication is transmitted, are then extracted from the communication. For example, one or more Internet Protocol (IP) addresses may be extracted. The identifiers are associated in a database with respective physical locations. When a particular area is defined as an area of interest, at least one of the identifiers is selected from the database, the selected identifier being associated with a physical location that is within, or near, the area of interest. Image data transmitted under the selected identifier is then received by the interested parties.

System Description

Figure 1:
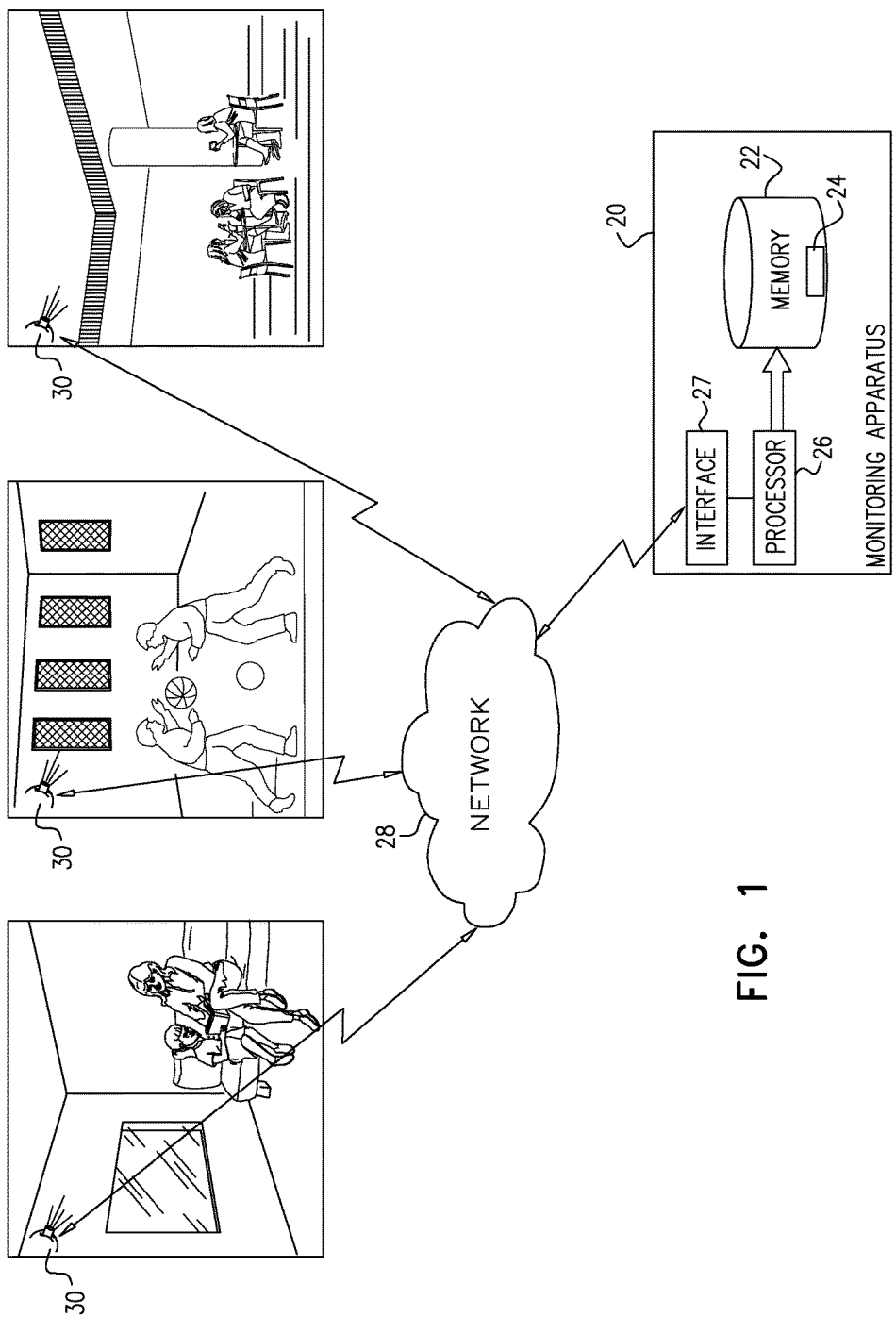
FIGS. 1 and 2 are block diagrams that schematically illustrate monitoring apparatus in operation, in accordance with some embodiments described herein.

Reference is initially made to FIG. 1, which is a block diagram that schematically illustrates monitoring apparatus 20 in operation, in accordance with some embodiments described herein. FIG. 1 shows a plurality of imaging devices 30 communicating over a network 28. For example, each of imaging devices 30 may be transmitting images to a remote user of the imaging device.

Network 28 may comprise, for example, a public network such as a cellular network and/or the Internet. Devices 30 may comprise, for example, closed-circuit video cameras or other security cameras, video-enabled alarm systems, wearable video cameras connected to the Internet over a wireless connection, vehicle dashboard cameras, or any other suitable device that is able to generate still or video images and transmit them over network 28. A given device 30 may be constantly active, e.g., as in a streaming video camera, or activated on-demand. Some of devices 30 may be owned and operated by private individuals, whereas others may be public or operated by organizations or other entities.

Devices 30 may communicate over network 28 using any suitable protocol, e.g., using the HyperText Transfer Protocol (HTTP), User Datagram Protocol (UDP), or Transmission Control Protocol (TCP). Some devices 30 may communicate unidirectionally, i.e., only transmit over the network. Other devices 30 may communicate bidirectionally, such that, in addition to transmitting, they may receive command-and-control instructions from their users.

Monitoring apparatus 20 comprises a processor 26 and a network interface 27, comprising, for example, a network interface card. Typically, apparatus 20 further comprises a digital memory 22 (i.e., a data storage device), such as a hard disk drive or solid-state drive, typically comprising a database 24. In some embodiments, memory 22 and processor 26 are part of the same physical unit; in other embodiments, memory 22 is located remotely from processor 26, e.g., "in the cloud."

Processor 26 monitors communication over network 28, and identifies imaging-device communication (i.e., communication from imaging devices) transmitted over the network. For example, the processor identify a particular instance of imaging-device communication by identifying, in the communication, "metadata," such as an imaging-device model number, that indicates that the communication is from an imaging device. Alternatively or additionally, the processor may identify a particular instance of imaging-device communication by ascertaining that the communication is image-data communication (i.e., the communication includes image data). In other words, the processor may "extract" image-data communication, e.g., by using a filter that utilizes pattern-recognition and/or classification techniques to allow only image-data communication to pass therethrough. In some embodiments, techniques described in U.S. Pat. No. 8,959,025 to Malinsky, whose disclosure is incorporated herein by reference, may be used to identify image-data communication, and/or to identify the codec used to encode the image-data communication.

The processor extracts, from the identified imaging-device communication, one or more identifiers under which the imaging-device communication is communicated. Such identifiers may be unique identifiers of the imaging devices that transmitted the data. For example, in some embodiments, the processor identifies International Mobile Subscriber Identities (IMSIs) of one or more imaging devices. Alternatively, such identifiers may identify the respective networks (e.g., local area networks) to which the imaging devices are connected, such that more than one imaging device may transmit under a particular identifier. Examples of such identifiers include Internet Protocol (IP) addresses.

In general, the identifying that is performed by processor 26 may have any degree of "specificity." That is, the processor may broadly identify all imaging-device communication over the network, or may restrict the identifying, e.g., such that only communication emanating from a particular geographical area is identified. In some embodiments, the processor identifies only communication that is associated with particular information, such as particular phone numbers or email addresses. Such "targeted" identification may be facilitated by the use of a suitable filter that allows only relevant communication to pass therethrough. For example, while a "wide" filter may allow all imaging-device communication to pass therethrough, a "narrower" filter may allow only certain imaging-device communication to pass therethrough.

The processor stores the identifiers in database 24. Typically, the identifiers are associated in the database with respective physical locations. In particular, each identifier is typically associated with the estimated physical location of the imaging device(s) that transmit under the identifier. The association between the identifiers and the respective physical locations may be obtained in various ways. For example:

(i) The processor may extract, from the identified imaging-device communication, "geolocation" information. For example, the processor may extract GPS coordinates transmitted by the imaging devices or by other devices that are connected (e.g., over the network) to the imaging devices. The identifiers may then be associated with the respective physical locations implied by such geolocation information.

(ii) The processor may obtain the association from one or more "external" data sources. For example, some communication service providers (CSPs) maintain a collection of customer addresses, each of the addresses being "paired" in the collection with one or more identifiers. (Such a collection may be part of a Customer Relationship Management scheme.) Hence, the processor may obtain the association from the CSPs, by "matching" each of the extracted identifiers with an identifier contained in the collection. Alternatively or additionally, any other suitable external data sources may be used.

In some cases, the association may be obtained directly. For example, if the extracted identifier is an IP address (e.g., a fixed IP address), and the CSP collection contains the same IP address, the association between the extracted identifier and a physical location may be obtained directly from the CSP.

In other cases, the association may be obtained only indirectly. For example, some addresses in the CSP collection may be associated with Remote Authentication Dial-In User Service (RADIUS) usernames, which may not be explicitly contained in the identified imaging-device communication, rather than with IP addresses. Hence, in order to obtain the association between an extracted IP address and a physical location, it may be necessary to first "map" the extracted IP address to a RADIUS username. The processor may obtain this mapping, by monitoring communication between the CSP and the routers that the CSP serves. (In other words, the processor may ascertain the RADIUS username of the router to which the CSP assigned the extracted IP address.) The extracted IP address may then be associated in the database with the physical location that is paired with the ascertained RADIUS username. The ascertained RADIUS username may then be stored in the database, together with the IP address and the physical location.

Alternatively or additionally, the identifiers may be associated in the database with other relevant data, such as names of persons, phone numbers, and/or email addresses. Such data may be obtained, for example, from a CSP, as described hereinabove.

Typically, the processor further extracts, from the identified imaging-device communication, metadata transmitted from the imaging devices. For example, the processor may extract the respective manufacturers and/or models of the imaging devices. In some cases, as noted above, such metadata is explicitly contained in the communication. In other cases, algorithmic techniques, such as pattern-recognition or classification techniques, are used to identify the manufacturer and/or model of the device, based on identified transmission parameters such as packet sizes and transmission protocols. Other types of metadata include information relating to WiFi networks near the imaging devices, and/or any relevant transmission parameters. In general, metadata extracted by the processor may be used to facilitate the association of the identifiers with the respective physical locations, and/or may be associated with the identifiers in the database, for future reference. For example, as described hereinbelow, information relating to an imaging device's manufacturer and/or model may be used to facilitate logging in to the imaging device.

Figure 2:
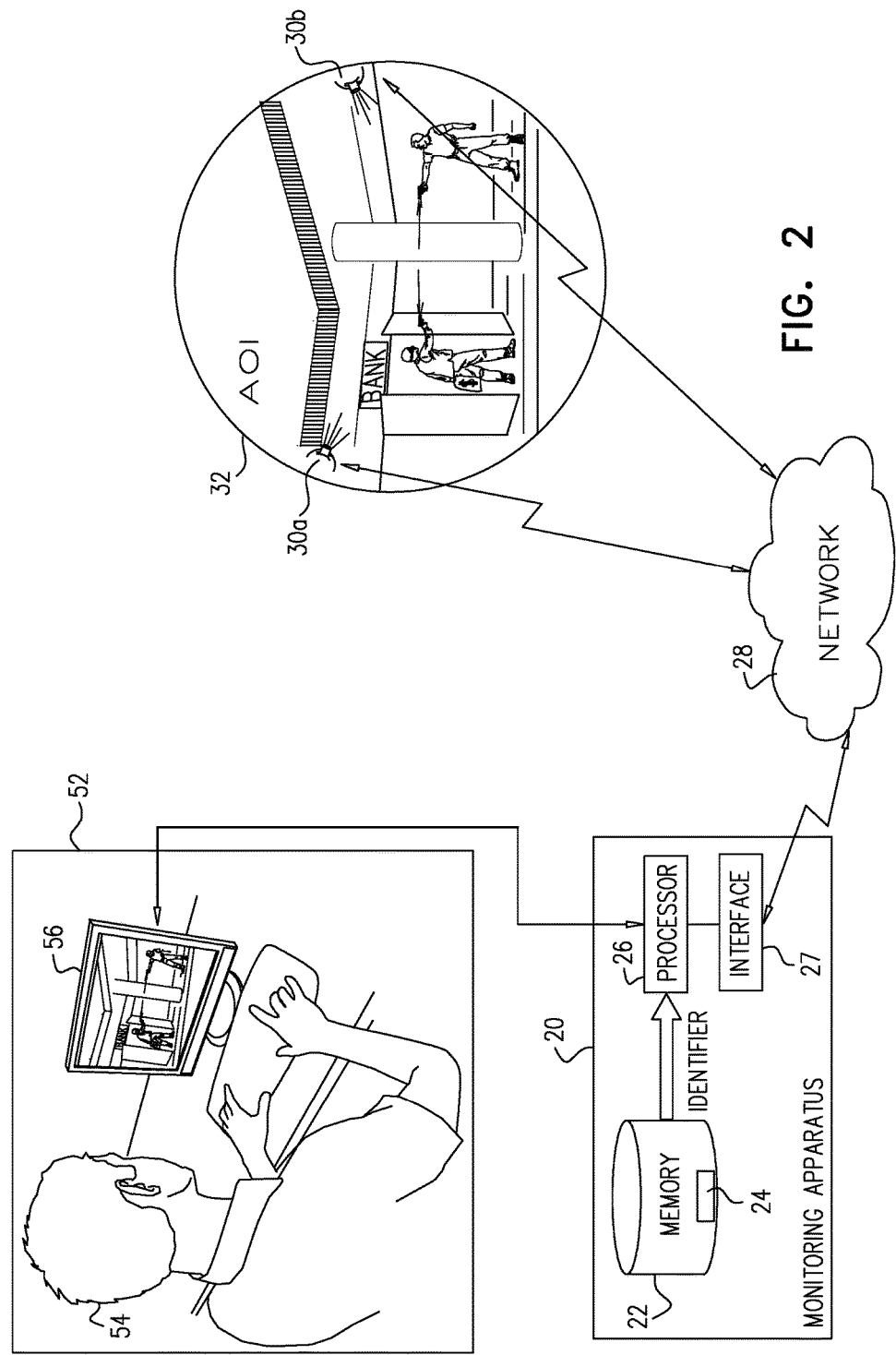

Reference is now made to FIG. 2, which is a block diagram that schematically illustrates monitoring apparatus 20 in operation, in accordance with some embodiments described herein. FIG. 2 shows an area of interest (AOI) 32, which may be defined as described hereinbelow. FIG. 2 further shows a monitoring center 52, in which a user 54 of apparatus 20, such as a security (e.g., "Homeland Security") or law enforcement worker, is using the apparatus to monitor activity in the AOI.

AOI 32 may be defined automatically (e.g., by processor 26), or manually (e.g., by user 54), and in response to various factors. For example:

(i) A particular area may be defined as AOI 32, in response to identifying that a particular subject is visiting the particular area. Such identification may be performed manually, or alternatively, may be performed automatically, e.g., by the processor receiving a location signal from the subject's mobile phone.

(ii) A particular area may be defined as AOI 32, in response to an indication (e.g., an email, text message, or telephone call) emanating from the particular area. For example, such an indication may be transmitted over the network to a particular person or entity by a device located in the particular area. The processor intercepts the indication, and in response to the indication, AOI 32 automatically or manually defined. For example, an alarm system installed in the particular area may transmit an alarm indication over the network, and the particular area may be defined as the AOI in response to the alarm indication. Alternatively or additionally, the AOI may be defined in response to a distress indication (e.g., a "911" call) emanating from the area.

(iii) Processor 26 may automatically define an area as an AOI in any other suitable way and in response to any other suitable condition or event. For example, the processor may use a predefined set of rules to define the AOI, such that, for example, a particular area is automatically defined as the AOI upon the density of people within the area reaching a predefined threshold. (The processor may use external sources of information, such as cellphone service providers, to ascertain that the density has likely reached the threshold.)

(iv) The user may input the AOI to the processor, e.g., by inputting a physical address or boundaries of a city block, in response to any relevant factors.

Upon AOI 32 being defined, the processor selects, from database 24, at least one of the identifiers, the selected identifier being associated in the database with one of the physical locations that is in proximity to AOI 32. In other words, the selected identifier is associated with a physical location that is contained within, or is near, AOI 32, such that the imaging device(s) associated with the selected identifier are likely to be imaging the AOI. For example, FIG. 2 shows the selection of an identifier under which two imaging devices 30a and 30b, which are located within the AOI, transmit.

The processor then selectively receives image data (i.e., still images or video streams) transmitted under the selected identifier. (In other words, the processor "targets" the selected identifier, by intercepting image data transmitted under the selected identifier.) The image data are then displayed to the user on a display 56, allowing the user to monitor activity in the AOI. In some embodiments, the processor further selectively receives audio data, and/or other types of data, transmitted under the selected identifier, this data being played or otherwise presented to the user.

In some embodiments, an identifier is selected from the database, in response to the identifier being associated in the database with data of interest, regardless of whether an AOI is defined. For example, a particular identifier may be associated in the database with a particular subject, such as in the case that the particular identifier is the IP address of the subject's home router. In response to the particular subject being of interest, the particular identifier may be selected.

In some cases, an imaging device that transmits under the selected identifier is already transmitting image data over the network. In such cases, to selectively receive the image data, it is typically sufficient to intercept the image data, as described hereinabove. In other cases, the imaging device may be currently inactive, such that imaging device will not generate image data, and/or transmit the generated image data over the network, unless driven to do so. Hence, in some cases, it may be necessary to drive the imaging device to generate the image data, and/or transmit the generated image data over the network. Embodiments described hereinbelow address these cases.

Typically, in order to control an imaging device over a network, it is necessary to first log in to the imaging device, by entering access credentials (e.g., a username and password) into a server that serves the imaging device. Typically, all imaging devices of a particular type or model have the same default access credentials, which are provided, for example, by a manufacturer or distributor of the particular type or model. Although the user of a particular imaging device has the option of changing the access credentials from the default, the inventors have observed that in practice the user rarely does so. Hence, metadata relating to the manufacturer and/or model of the imaging device may be used to obtain the default access credentials for the imaging device. The default access credentials may then be used to log in to an imaging device located in, or near, AOI 32. While logged in to the imaging device, the imaging device may then be driven to generate and/or transmit image data to the processor.

In some embodiments, an imaging parameter (e.g., an angle of orientation, and/or a focus) of the imaging device is controlled, while logged in to the imaging device.

In some embodiments, multiple imaging devices are logged into simultaneously, and are driven to image and/or transmit image data.

In some embodiments, the monitoring of activity within AOI 32 occurs in "real time," i.e., as the image data is received over the network. In other embodiments, the monitoring occurs "offline." In some such embodiments, video summarization techniques may be used to efficiently present the image data to the user.

Table 1 below depicts a purely illustrative sample record in database 24. It is noted that records in database may include other relevant fields (e.g., a field relating to operational details, or "last known status," of an imaging device), in addition the fields shown in Table 1. Alternatively or additionally, some fields shown in Table 1 may be omitted in practice.

TABLE 1

| Identifier | Manufacturer | Location | Default username | Default password |
|---|---|---|---|---|
| 194.66.82.11 | Imaging Corp. | 123 Money Road | Admin | Admin123 |

Communication between processor 26 and memory 22 is bidirectional. Nevertheless, FIG. 1 shows a unidirectional arrow from processor 26 to memory 22 to emphasize the flow of information from processor 26 to memory 22, in that FIG. 1 primarily depicts the activities of apparatus 20 by which relevant information is stored in the database, as described hereinabove. Likewise, FIG. 2 shows a unidirectional arrow from memory 22 to processor 26 to emphasize the flow of information from memory 22 to processor 26, in that FIG. 2 primarily depicts the activities of apparatus 20 by which relevant information is retrieved from the database and is used to receive image data from imaging devices located within or near the AOI, as described hereinabove.

The configurations of apparatus 20 shown in FIGS. 1 and 2 are example configurations that are chosen purely for the sake of conceptual clarity. In alternative embodiments, any other suitable system configuration can be used. For example, although FIG. 2 shows processor 26 communicating with monitoring center 52 from a remote location, it is noted that processor 26 may be located within monitoring center 52, e.g., such that processor 26 and display 56 are integrated in a single system.

The various elements of apparatus 20 may be implemented using software, using hardware, or using a combination of software and hardware elements.

Figure 3:
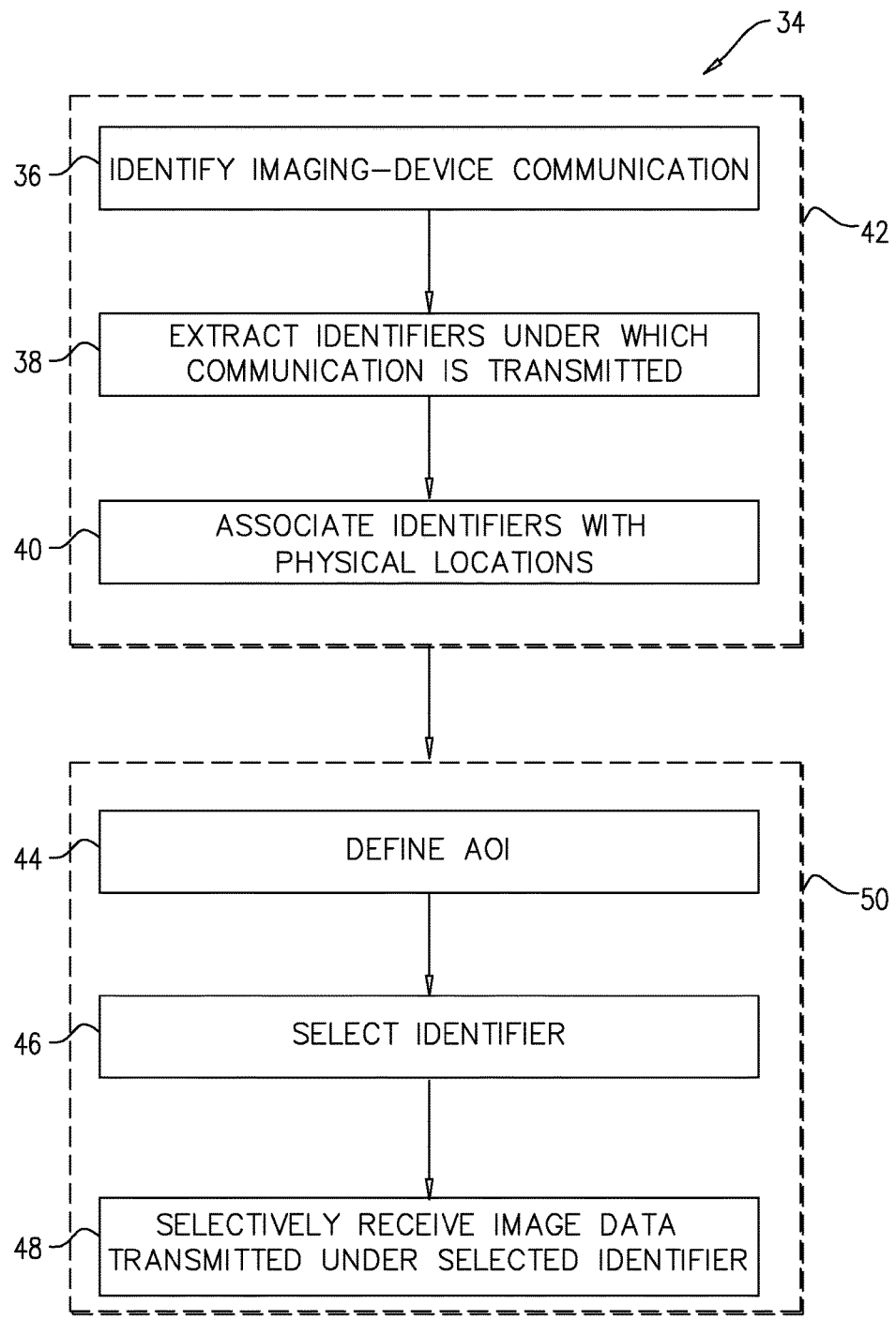
FIG. 3 is a flow chart for a method practiced in accordance with some embodiments described herein.

Reference is now made to FIG. 3, which is a flow chart for a method 34 practiced in accordance with some embodiments described herein. Method 34 comprises two sub-methods: a first sub-method 42, which generally corresponds to the activities of apparatus 20 described hereinabove with reference to FIG. 1, and a second sub-method 50, which generally corresponds to the activities of apparatus 20 described hereinabove with reference to FIG. 2.

In first sub-method 42, at an identifying step 36, apparatus 20 identifies imaging-device communication transmitted over network 28, as described hereinabove. At an extracting step 38, apparatus 20 extracts, from the communication, one or more identifiers under which the communication is transmitted, as described hereinabove. Apparatus 20 then associates in the database, at an associating step 40, the extracted identifiers with respective physical locations, as described hereinabove.

In second sub-method 50, apparatus 20 first defines an area of interest at an AOI-defining step 44, as described hereinabove. In response to the AOI, apparatus 20 then selects, at a selecting step 46, at least one of the identifiers, as described hereinabove. Finally, at a receiving step 48, the apparatus selectively receives image data transmitted under the selected identifier, as described hereinabove.

In general, processor 26 may be embodied as a single processor, or a cooperatively networked or clustered set of processors. Processor 26 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Although the embodiments described herein mainly address imaging devices, the principles of the present disclosure can also be used for other types of devices (e.g., "IoT" devices) that communicate over a network, such as printers, wearables (e.g., "smart watches"), vehicles (e.g., "smart cars"), and appliances.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    identifying, via a monitoring apparatus communicatively coupled to a network, communication transmitted over the network as being from one or more imaging devices;
    extracting, from the communication, one or more identifiers under which the communication is transmitted, the one or more identifiers corresponding to the one or more imaging devices;
    storing the identifiers in a digital memory, wherein storing the identifiers in the digital memory comprises associating, in the digital memory, the one or more identifiers with respective physical locations of the one or more imaging devices;
    defining a particular area as an area of interest in response to an indication emanating from the particular area, wherein the indication is an email, text message, or telephone call transmitted over the network by a device located in the particular area;
    selecting, from the digital memory, an identifier that is associated in the digital memory with a physical location that is in proximity to the defined area of interest;
    selectively receiving image data transmitted under the selected identifier via the monitoring apparatus; and
    transmitting the image data to a display for monitoring activity within the area of interest.

2. The method according to claim 1, wherein identifying the communication as being from an imaging device comprises identifying the communication as being from an imaging device by ascertaining that the communication includes image data.

3. The method according to claim 1, wherein extracting the one or more identifiers comprises extracting one or more Internet Protocol (IP) addresses.

4. The method according to claim 1, wherein extracting the one or more identifiers comprises extracting one or more International Mobile Subscriber Identities (IMSIs).

5. The method according to claim 1, further comprising obtaining the association between the identifiers and the respective physical locations from one or more communication service providers (CSPs).

6. The method according to claim 1, further comprising:
    logging in to the imaging device that transmits under the selected identifier; and
    driving the imaging device to transmit the image data over the network.

7. The method according to claim 6, wherein logging in to the imaging device comprises logging in to the imaging device using default access credentials for the imaging device.

8. The method according to claim 6, further comprising controlling an imaging parameter of the imaging device.

9. Monitoring apparatus for use with a digital memory, the monitoring apparatus comprising:
    a network interface communicatively coupled to a network; and
    a processor, configured to:
        via the interface, identify communication transmitted over the network as being from one or more imaging devices,
        extract, from the communication, one or more identifiers under which the communication is transmitted, the one or more identifiers corresponding to the one or more imaging devices,
        store the identifiers in the digital memory, wherein storing the identifiers in the digital memory comprises associating, in the digital memory, the one or more identifiers with respective physical locations of the one or more imaging devices,
        define a particular area as an area of interest in response to an indication emanating the particular area, wherein the indication is an email, text message, or telephone call transmitted over the network by a device located in the particular area,
        select, from the digital memory, an identifier associated in the digital memory with a physical location that is in proximity to the defined area of interest,
        selectively receive image data transmitted under the selected identifier via the interface, and
        transmit the image data to a display for monitoring activity within the area of interest.

10. The monitoring apparatus according to claim 9, wherein the processor is configured to identify the communication as being from an imaging device by ascertaining that the communication includes image data.

11. The monitoring apparatus according to claim 9, wherein the processor is further configured to, via the network interface:
    log in to the imaging device that transmits under the selected identifier, and
    drive the imaging device to transmit the image data over the network.

12. The monitoring apparatus according to claim 11, wherein the processor is configured to log in to the imaging device using default access credentials for the imaging device.

13. The monitoring apparatus according to claim 11, wherein the processor is further configured to:
    control an imaging parameter of the imaging device.

14. The monitoring apparatus according to claim 9, wherein the processor is configured to extract the one or more identifiers by extracting one or more Internet Protocol (IP) addresses.

15. The monitoring apparatus according to claim 9, wherein the processor is configured to extract the one or more identifiers by extracting one or more International Mobile Subscriber Identities (IMSIs).

16. The monitoring apparatus according to claim 9, wherein the processor is further configured to:
   obtain the association between the identifiers and the respective physical locations from one or more communication service providers (CSPs).

\* \* \* \* \*